United States Patent
Kuo et al.

(10) Patent No.: US 8,515,069 B2
(45) Date of Patent: Aug. 20, 2013

(54) METHOD AND APPARATUS FOR ENCRYPTING/DECRYPTING PACKET DATA OF PRECISE TIME SYNCHRONIZATION PROTOCOL AND TIME SYNCHRONIZATION SYSTEM

(75) Inventors: Lung-Chih Kuo, Tainan County (TW); Han-Chiang Chen, Tainan (TW); Zhong-Zhen Wu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 1050 days.

(21) Appl. No.: 12/405,248

(22) Filed: Mar. 17, 2009

(65) Prior Publication Data
US 2010/0153742 A1 Jun. 17, 2010

(30) Foreign Application Priority Data

Dec. 15, 2008 (TW) ................................. 97148840 A (51) Int. Cl.
*H04L 29/06* (2006.01)
*G06F 1/12* (2006.01)
(52) U.S. Cl.
USPC ............ 380/260; 380/37; 713/150; 713/151; 713/154; 713/168; 713/170; 709/248
(58) Field of Classification Search
USPC ..................................... 380/37, 216; 713/500
See application file for complete search history.

(56) References Cited

U.S. PATENT DOCUMENTS

| | | | | |
|---|---|---|---|---|
| 6,907,472 B2 * | 6/2005 | Mushkin et al. | ............... | 709/248 |
| 7,693,278 B2 * | 4/2010 | Hiramatsu et al. | ............... | 380/37 |
| 8,386,765 B2 * | 2/2013 | Fries et al. | ..................... | 713/150 |
| 2007/0033391 A1 | 2/2007 | Hiramatsu et al. | | |
| 2009/0160943 A1 * | 6/2009 | Badt et al. | ..................... | 348/180 |
| 2009/0222685 A1 * | 9/2009 | Foster et al. | ................... | 713/500 |
| 2010/0058101 A1 * | 3/2010 | Shahid et al. | ................. | 713/500 |

FOREIGN PATENT DOCUMENTS

WO 2006-128748 12/2006

OTHER PUBLICATIONS

Treytl et al., "Practical Application of 1588 Security," ISPCS 2008—International IEEE Symposium on Precision Clock Synchronization for Measurement, Control and Communication, Ann Arbor, Michigan, Sep. 22-26, 2008, pp. 37-43.

Schuler et al., "IEEE 1588 Security Extensions: Requirements and proposed solutions," IEEE 1588 Conference 2005, Sep. 29, 2005, pp. 1-36.

(Continued)

*Primary Examiner* — Shin-Hon Chen
(74) *Attorney, Agent, or Firm* — Jianq Chyun IP Office (57) ABSTRACT

A method and an apparatus for encrypting/decrypting packet data of a precise time synchronization protocol and a time synchronization system are illustrated. The method is suitable for the time synchronization system using a precise time protocol. The time synchronization system includes a master node and a slave node, wherein the slave node synchronizes its time with the master node. In the method for encrypting/decrypting packet data of the precise time synchronization protocol, an encryption/decryption hardware device is disposed on the hardware protocol layer of each of the master node and the slave node. The hardware protocol layer is under the data link layer, and includes the data link layer. A synchronization message is encrypted by using the encryption/decryption hardware devices of the master node to generate a frame data, and the frame data is decrypted by using the encryption/decryption hardware devices of the slave node to obtain the synchronization message.

20 Claims, 9 Drawing Sheets

(56) References Cited

OTHER PUBLICATIONS

Loschmidt et al., "Limits of Synchronization Accuracy Using Hardware Support in IEEE 1588," ISPCS 2008—International IEEE Symposium on Precision Clock Synchronization for Measurement, Control and Communication, Ann Arbor, Michigan, Sep. 22-26, 2008, pp. 12-16.
Kuo et al., "A MAC supports the IEEE 1588 Packet Encryption," ISPCS 2008 Poster Session, Sep. 24, 2008 pp. 137-141.
"Office Action of Taiwan counterpart application" issued on Jun. 21, 2012, p1-p9.

* cited by examiner

METHOD AND APPARATUS FOR ENCRYPTING/DECRYPTING PACKET DATA OF PRECISE TIME SYNCHRONIZATION PROTOCOL AND TIME SYNCHRONIZATION SYSTEM

CROSS-REFERENCE TO RELATED APPLICATION

This application claims the priority benefit of Taiwan application serial no. 97148840, filed on Dec. 15, 2008. The entirety of the above-mentioned patent application is hereby incorporated by reference herein and made a part of specification.

BACKGROUND OF THE INVENTION

1. Field of the Invention

The present invention generally relates to a method and an apparatus for encrypting/decrypting packet data, and more particularly, to a method and an apparatus for encrypting/decrypting packet data of a precise time synchronization protocol.

2. Description of Related Art

At times, or sometimes, nodes of a network need to synchronize their time with each other to complete a specific task together. Thus, different network time synchronization methods have been provided, wherein the most common methods include the network time protocol (NTP), the real-time transport protocol (RTP), and the precise time protocol (PTP) defined by the IEEE 1588 standard.

The RTP and NTP are used for time synchronization on the application layer, while the PTP is used for time synchronization on the network layer. Accordingly, the time delay of the PTP is shorter than that of the RTP, and the time precision of the PTP is much higher than those of the NTP and the RTP. The time delay of the NTP and the RTP is about equal to the time delay from the physical layer, the network driving program, the operating system core, until the application program.

A best master clock (BMC) algorithm is specified by the PTP. Each node executes the BMC algorithm by comparing a received PTP packet message with its own local clock to determine whether the node itself could be the best master clock. There could be only one master node among all the nodes to be synchronized. All the slave nodes synchronize their time with the master node, and the master node issues a time synchronization signal to the slave nodes every two seconds to maintain the time synchronization constantly.

In an automatic control application, a time synchronization system requires equipments having high isochronism in order to sort the working order of these automatic equipments. For example, the isochronous real-time (IRT) technique for synchronizing robot arms, motor speed controller and console microcomputers can meet the high-speed communication requirement of movement control. When there are 1000 nodes, the response time required by a time synchronization system should be shorter than 1 µs, and the jitter error should be less than 10 ns in order to ensure real-time and accurate responses. Thereby, most time synchronization systems adopt the PTP for carrying out time synchronization.

The security of packet data has to be ensured when a PTP packet (also referred to as an isochronal packet) is transmitted. An unencrypted PTP packet may be stolen or eavesdropped by a network hacker, and the hacker may further obtain the control right over the entire time synchronization system or interrupt the synchronization time of nodes in the entire network by altering the time stamp in the PTP packet. Thus, if a time synchronization system adopted by an automatic equipment application is hacked by a hacker, the originally sorted mass-production flow will be disturbed and accordingly a big loss will be caused to the company or factory.

Figure 1:
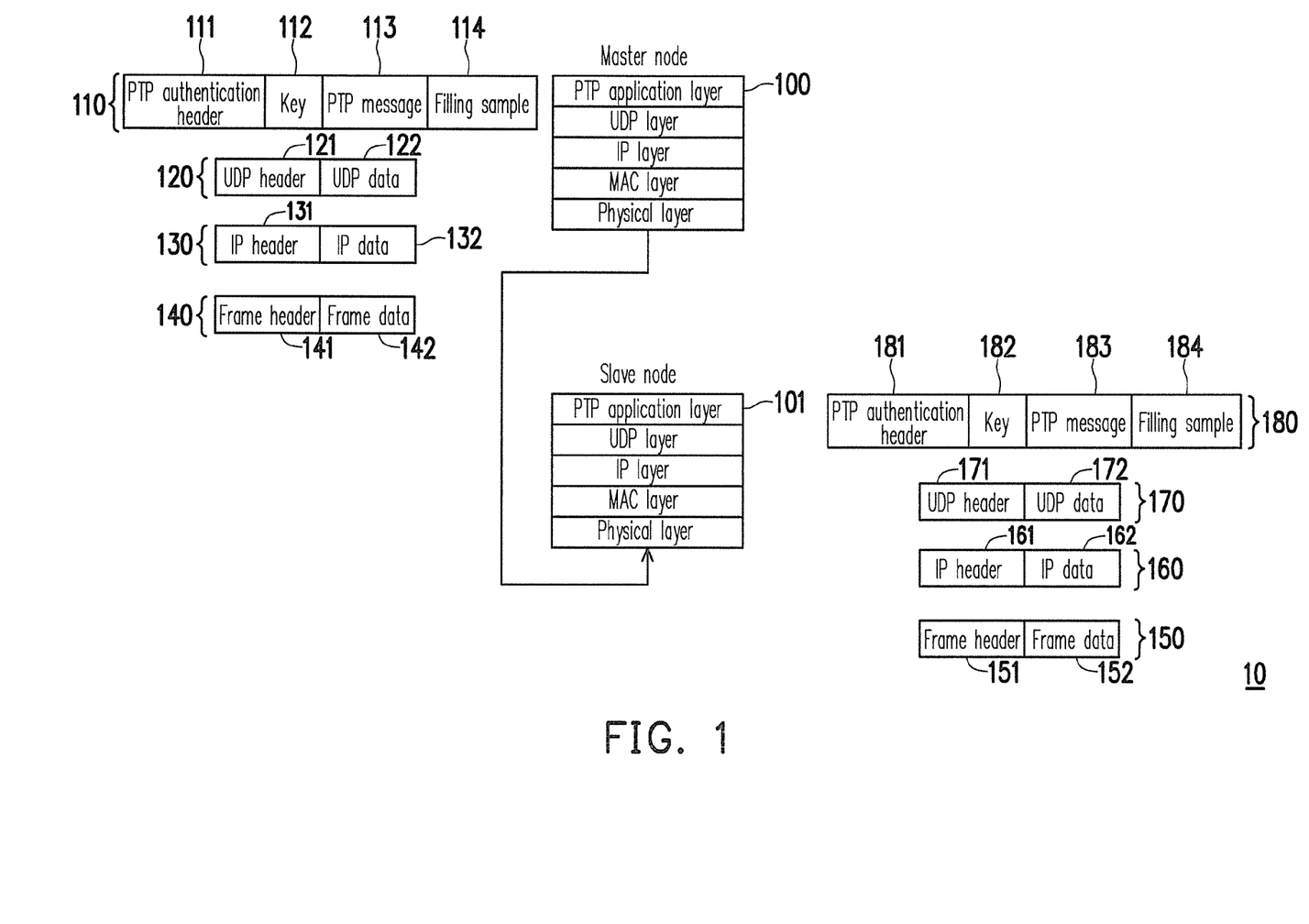
FIG. 1 is a schematic diagram illustrating how conventionally a precise time protocol (PTP) packet is encrypted.

FIG. 1 is a schematic diagram illustrating how conventionally a PTP packet is encrypted and decrypted. Referring to FIG. 1, the conventional time synchronization system 10 includes a master node 100 and a slave node 101, wherein the master node 100 and the slave node 101 both adopt the User Datagram Protocol/Internet Protocol (UDP/IP).

First, when the master node 100 is about to transmit a PTP packet 110, the master node 100 first executes a PTP application program on the PTP application layer. The PTP application program calls the central processing unit (CPU) to execute an encryption program for encrypting the synchronization data and the time stamp and packages the encrypted synchronization data and time stamp into the PTP packet 110. The PTP packet 110 includes a PTP authentication header 111, a key 112, a PTP message 113, and a filling sample 114. Then, the PTP packet 110 is sent to the UDP layer and packaged into a UDP packet 120 (including a UDP data 122 and a UDP header 121). Next, the UDP packet 120 is sent to the IP layer and packaged into an IP packet 130 (including an IP data 132 and an IP header 131). After that, the IP packet 130 is sent to the medium access control (MAC) layer and packaged into a frame 140 (including a frame data 142 and a frame header 141). Thereafter, the frame 140 is sent to the physical layer, and the master node 100 transmits the frame 140 to the slave node 101 via the physical layer to carry out the time synchronization.

The slave node 101 receives the frame 150 (including a frame data 152 and a frame header 151) from the physical layer and sends the frame 150 to the MAC layer. The MAC layer processes the frame 150 to generate an IP packet 160 (including an IP data 162 and an IP header 161) for the IP layer. Then, the IP layer processes the IP packet 160 to generate a UDP packet 170 (including a UDP data 172 and a UDP header 171) for the UDP layer. After that, the UDP layer processes the UDP packet 170 to generate a PTP packet 180 (including a PTP authentication header 181, a key 182, a PTP message 183, and a filling sample 184) for the PTP application layer. Thereafter, the PTP application layer calls the CPU to execute a decryption program for decrypting the PTP packet 180, so as to obtain the synchronization data and the time stamp.

It should be mentioned that the PTP message contains the time stamp and the synchronization data, etc. The filling sample is used for filling up the unused bits in the PTP packet so that the length of the PTP packet can meet the specified PTP packet length. The PTP authentication header contains information about whether the data is encrypted, information about the length of the key, information about the length of the PTP message, and information about the length of the filling sample.

In the conventional method for encrypting/decrypting a PTP packet, the encryption and decryption operations are carried out on the PTP application layer, and the data is processed and transmitted on many different layers before the slave node obtains the time stamp and the synchronization data and accordingly carries out the time synchronization action. Thus, a delay time and a latency time are produced, since the time stamp obtained by the slave nodes transmitted through a large protocol stack. As a result, the time when the time stamp is obtained by the slave node is delayed for several milliseconds compared to the time when the PTP packet is transmitted by the master node.

It should be noted that the time delay caused by the protocol stack is mainly related to the execution performances of the master node and the slave node, and since the execution performance of the master node and slave node is difficult to estimate, the time delay caused by the protocol stack is difficult to be obtained.

Figure 2:
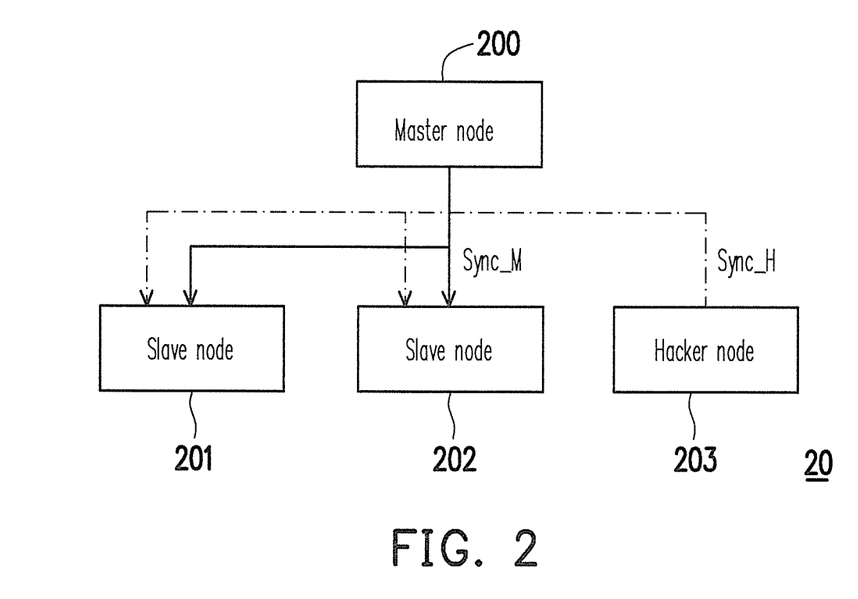
FIG. 2 is a schematic diagram illustrating a conventional time synchronization system intruded by a hacker node.

FIG. 2 is a schematic diagram illustrating a conventional time synchronization system hacked by a hacker node. Referring to FIG. 2, the conventional time synchronization system 20 includes a master node 200 and slave nodes 201 and 202, wherein the slave nodes 201 and 202 have to obtain their keys from the PTP packet transmitted by the master node 200. Each time when the master node issues a synchronization signal Sync_M to the slave nodes 201 and 202 to synchronize their time, the slave nodes 201 and 202 decrypt the PTP messages according to the keys to synchronize their time with the master node 200.

If a hacker node 203 steals the encryption/decryption program from the conventional time synchronization system 20, the hacker node 203 can obtain the key and the IP data of the master node. Then, the hacker node 203 may pretend as the master node and randomly issues a synchronization signal Sync_H to request the slave nodes 201 and 202 to synchronize their time with the hacker node 203. As a result, the entire conventional time synchronization system 20 will be broken down.

Figure 3A:
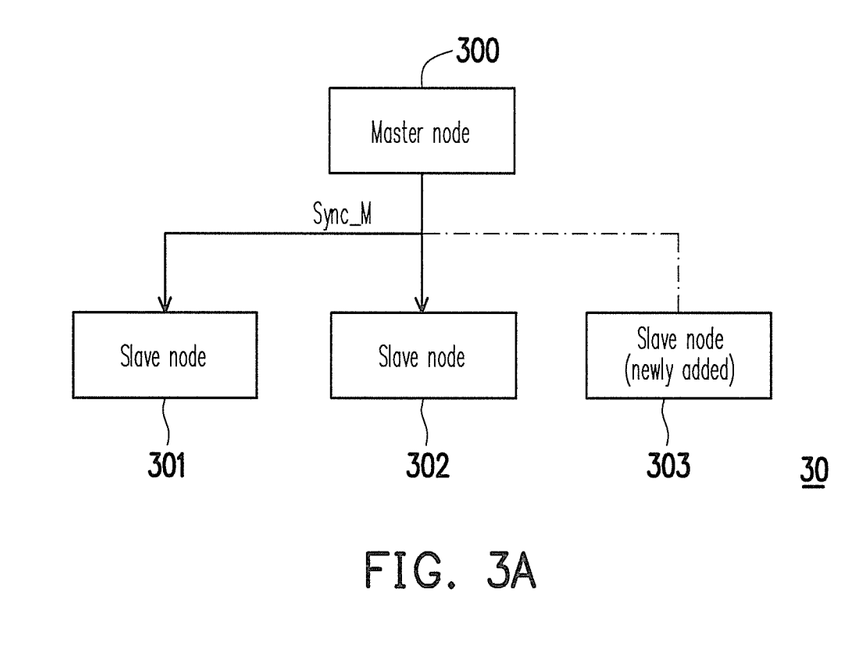
FIG. 3A is a schematic diagram illustrating how a slave node is newly added to a conventional time synchronization system.

FIG. 3A is a schematic diagram illustrating how a slave node is added to a conventional time synchronization system. Referring to FIG. 3A, the conventional time synchronization system 30 includes a master node 300 and slave nodes 301 and 302. When a slave node 303 is newly added to the conventional time synchronization system 30, since the slave node 303 has no key, it cannot decrypt the PTP message in the PTP packet and accordingly cannot carry out the time synchronization operation. Instead, the slave node 303 has to wait until the entire conventional time synchronization system 30 resets or when next time the master node 300 sends keys to all the slave nodes 301~303 to synchronize their time.

Figure 3B:
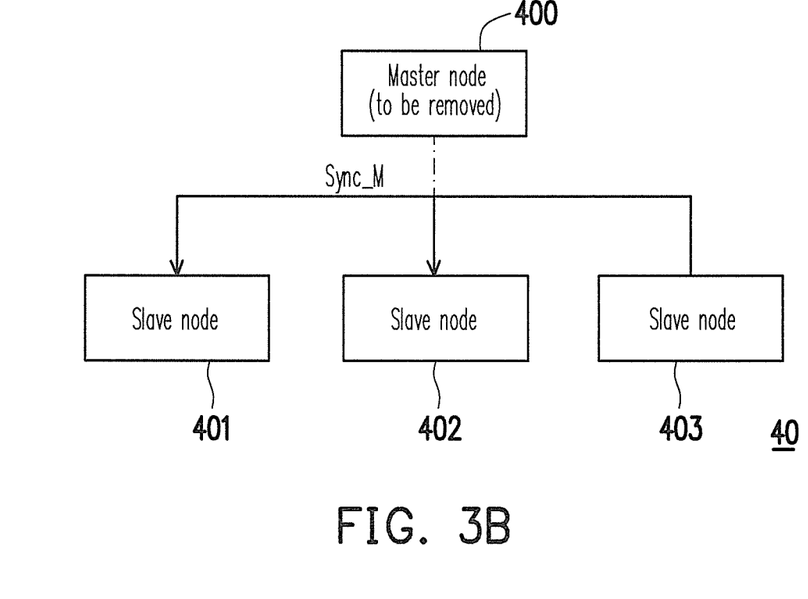
FIG. 3B is a schematic diagram illustrating how a master node is removed from a conventional time synchronization system.

FIG. 3B is a schematic diagram illustrating how a master node is removed from a conventional time synchronization system. Referring to FIG. 3B, the conventional time synchronization system 40 includes a master node 400 and slave nodes 401~403. When the master node 400 is intended to be removed from the conventional time synchronization system 40, each of the slave nodes 401~403 in the time synchronization system 40 has to execute the BMC algorithm to determine one of the slave nodes 401~403 as a new master node. The new master node transmits new keys to the slave nodes 402 and 403 (assuming the slave node 401 is determined as the new master node) such that the slave nodes 402 and 403 can decrypt the encrypted PTP messages and synchronize their time with the new master node according to the new keys.

As described above, the conventional time synchronization system has long delay time and low data security. In addition, when a master node is removed or a new slave node is added, time synchronization cannot be carried out instantly. As a result, the expandability of the system is limited.

SUMMARY OF THE INVENTION

According to an exemplary embodiment consistent with the present invention, a method for encrypting/decrypting packet data of a precise time synchronization protocol is provided. The method is suitable for a time synchronization system using a precise time protocol (PTP). The time synchronization system includes a master node and a slave node, wherein the slave node synchronizes its time with the master node. In the exemplary method, an encryption/decryption hardware device is disposed on a hardware protocol layer of the master node, wherein the hardware protocol layer is under a data link layer, and includes the data link layer. Then, a synchronization message is encrypted by using the encryption/decryption hardware device of the master node to generate a frame data.

According to an exemplary embodiment consistent with the present invention, a time synchronization system using a PTP is provided. The exemplary time synchronization system includes a master node and a slave node. The master node includes an encryption/decryption hardware device. The encryption/decryption hardware device is disposed on a hardware protocol layer of the master node and is used for encrypting a synchronization message to generate a frame data. The master node transmits the frame data to the slave node to synchronize the slave node. The hardware protocol layer is under the data link layer, and includes the data link layer.

According to an exemplary embodiment consistent with the present invention, an apparatus for encrypting/decrypting packet data of a precise time synchronization protocol is provided. The exemplary apparatus is disposed in a node of a time synchronization system using a PTP. The apparatus includes a physical layer circuit, a network protocol stack and operating system circuit, and an encryption/decryption hardware device. The encryption/decryption hardware device is disposed between the physical layer circuit and the network protocol stack and operating system circuit for encrypting a synchronization message or decrypting a frame data.

As described above, in the method and apparatus for encrypting/decrypting packet data of the precise time synchronization protocol and the time synchronization system provided by the exemplary embodiments of the present invention, the time delay caused by protocol stack can be eliminated, the transparency in encrypting/decrypting the synchronization message is increased, and the security of the synchronization message is enhanced. Moreover, in the method and apparatus for encrypting/decrypting packet data of the precise time synchronization protocol and the time synchronization system provided by the exemplary embodiments of the present invention, when a new slave node is added or a master node is removed, the other nodes can be instantly synchronized.

BRIEF DESCRIPTION OF THE DRAWINGS

The accompanying drawings are included to provide a further understanding of the invention, and are incorporated in and constitute a part of this specification. The drawings illustrate exemplary embodiments of the present invention and, together with the description, serve to explain the principles of the invention.

DESCRIPTION OF THE EMBODIMENTS

Reference will now be made in detail to exemplary embodiments, examples of which are illustrated in the accompanying drawings. Wherever possible, the same reference numbers are used in the drawings and the description to refer to the same or like parts.

In exemplary embodiments consistent with the present invention, there is provided a method for encrypting/decrypting packet data of the precise time synchronization protocol is to encrypt/decrypt a synchronization message below the data link layer (including the data link layer) to generate a precise time protocol (PTP) packet.

Figure 4:
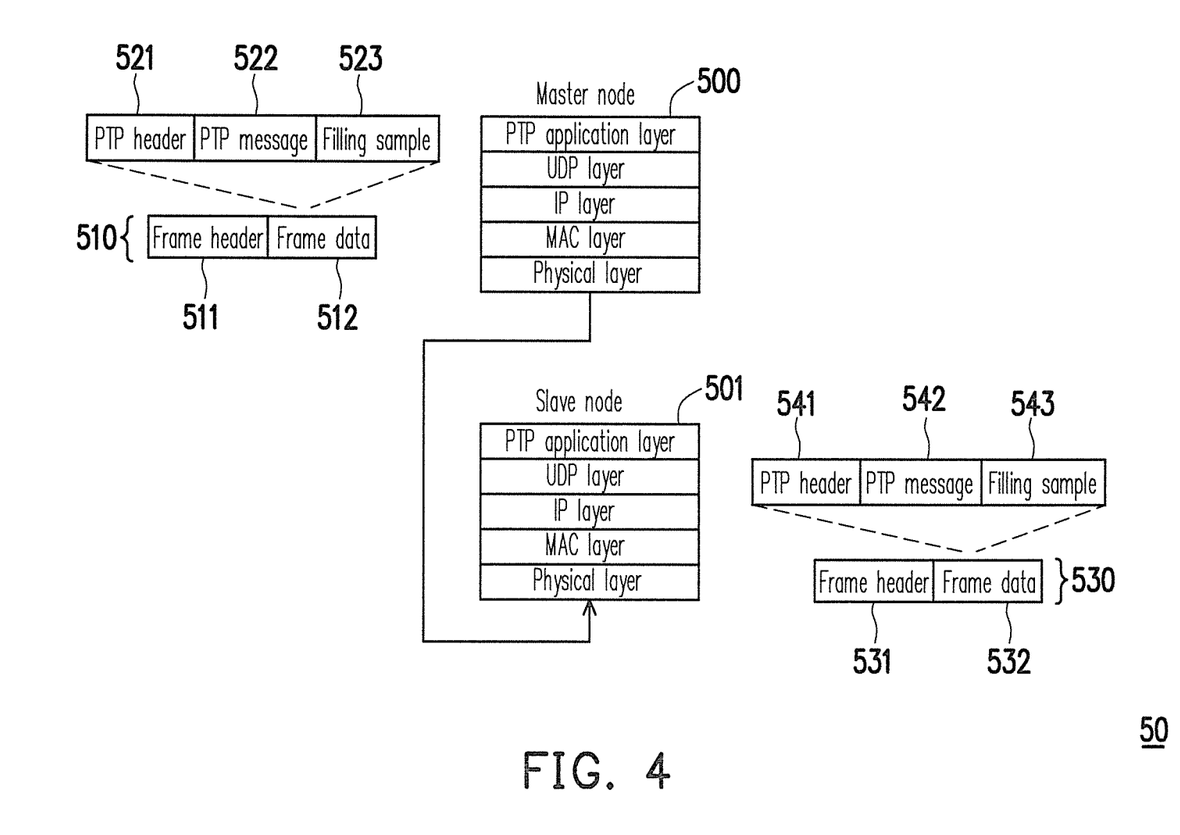
FIG. 4 is a schematic diagram illustrating a method for encrypting/decrypting a packet data of a precise time synchronization protocol according to an exemplary embodiment consistent with the present invention.

FIG. 4 is a schematic diagram illustrating a method for encrypting/decrypting a packet data of the precise time synchronization protocol according to an exemplary embodiment consistent with the present invention. Referring to FIG. 4, the time synchronization system 50 includes a master node 500 and a slave node 501. In the exemplary embodiment, when the PTP application layer of the master node 500 executes an instruction for transmitting a PTP packet, a medium access control (MAC) layer of the master node reads a current synchronization message, wherein the synchronization message contains a current time stamp and synchronization data. Then, an encryption/decryption hardware device disposed on the MAC layer of the master node encrypts the synchronization message. The MAC layer of the master node combines data on the IP layer and the encrypted synchronization message into a frame data 512 and packages the frame data 512 into a frame 510. After that, the MAC layer of the master node transmits the frame 510 to the slave node 501 through a transmission medium of the physical layer.

The frame 510 includes a frame header 511 and a frame data 512. The frame data 512 includes a PTP header 521, a PTP message 522, and a filling sample 523. The PTP header 521 contains information about whether the data is encrypted, information about the length of the PTP message, and information about the length of the filling sample. The filling sample 523 is used for filling up the unused bits in the PTP packet so that the PTP packet can meet the specified PTP packet length.

It should be mentioned that the PTP header 521 contains no information about the key length, and the frame data 510 contains no key. In the method for encrypting/decrypting packet data of the precise time synchronization protocol provided by the exemplary embodiment consistent with the present invention, the key is not transmitted together with the PTP packet but is acquired through authentication.

In other words, before synchronizing their time with each other, the master node 500 and the slave node 501 of the time synchronization system 50 have to pass the authentication of a key management server device to obtain their keys. However, the master node 500 can act as the key management server device itself. In this case, the slave node 501 passes the authentication of the master node 500 to obtain its key.

In addition, it has to be noted that in the exemplary embodiment, the UDP layer may be replaced by the TCP layer, the MAC layer may be a sub layer of the data link layer, and the encryption/decryption hardware device may be disposed on other sub layers of the data link layer. In short, the network protocol and the disposition of the encryption/decryption hardware device are not limited in the present invention.

The slave node 501 receives the frame 530 from the physical layer and transmits the frame 530 to the MAC layer. The frame 530 contains a frame header 531 and a frame data 532. The frame data 532 contains a PTP header 541, a PTP message 542, and a filling sample 543. The encryption/decryption hardware device on the MAC layer of the slave node 501 decrypts the frame data 532 according to the key to obtain the synchronization message and the data of the IP layer. Next, the MAC layer transmits the synchronization message to the PTP application layer via the IP layer and the UDP layer. The PTP application layer of the slave node 501 obtains the synchronization message and then synchronizes the time of the slave node 501 with the master node 500.

In the method provided by the exemplary embodiment, the synchronization message is encrypted/decrypted on the MAC layer. Thereby, the latency time and delay time produced by the protocol stack can be eliminated, and the time stamp obtained by the slave node 501 and the time when the frame 510 is sent out are very close to each other. In addition, unlike the conventional method wherein the data encryption/decryption is carried out on the PTP application layer by using software, the method in the present embodiment is to carry out data encryption/decryption by using the encryption/decryption hardware device. Accordingly, data security is improved in the exemplary embodiment.

Figure 5A:
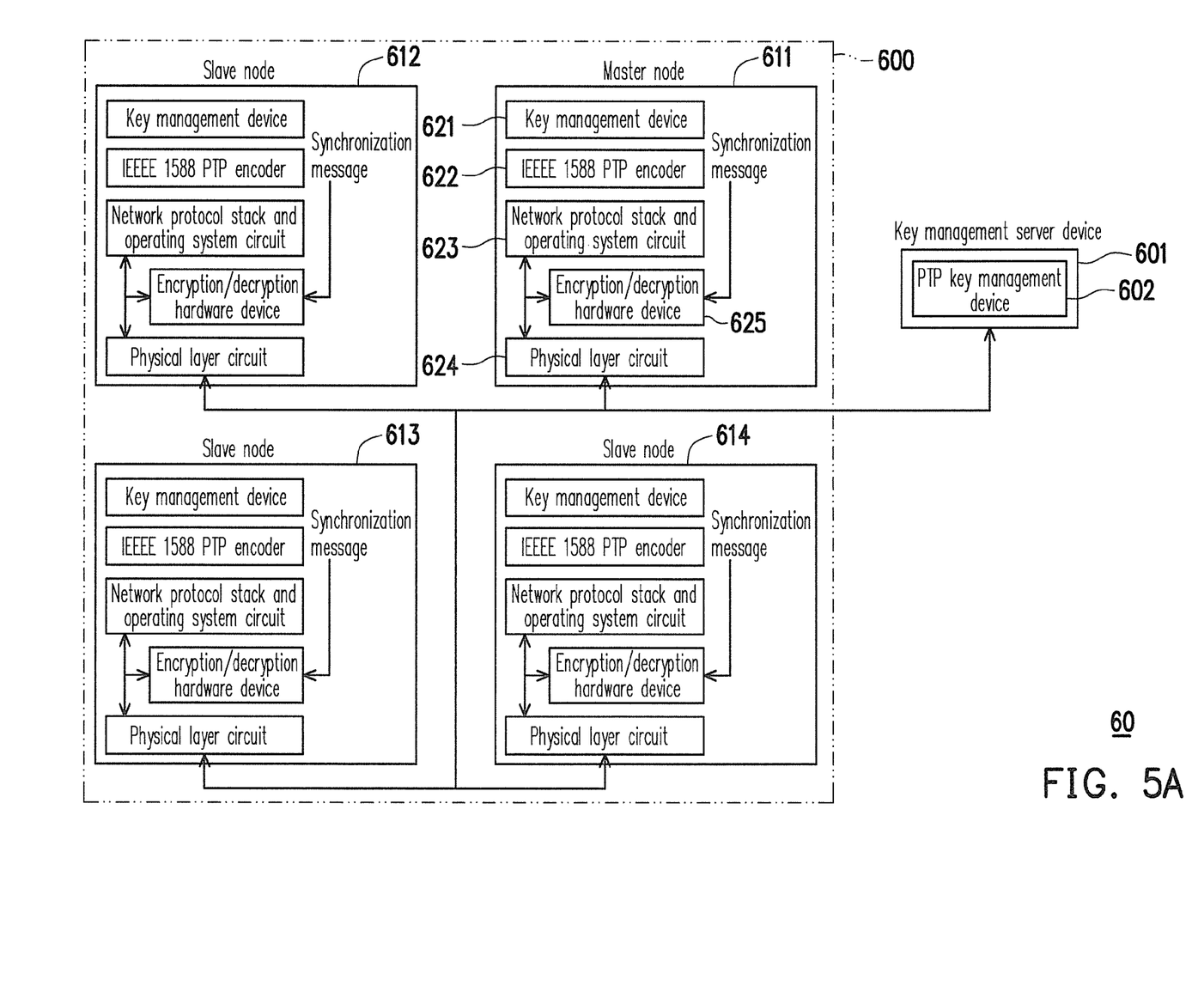
FIG. 5A is a block diagram of a time synchronization system according to an exemplary embodiment consistent with the present invention.
Figure 5B:
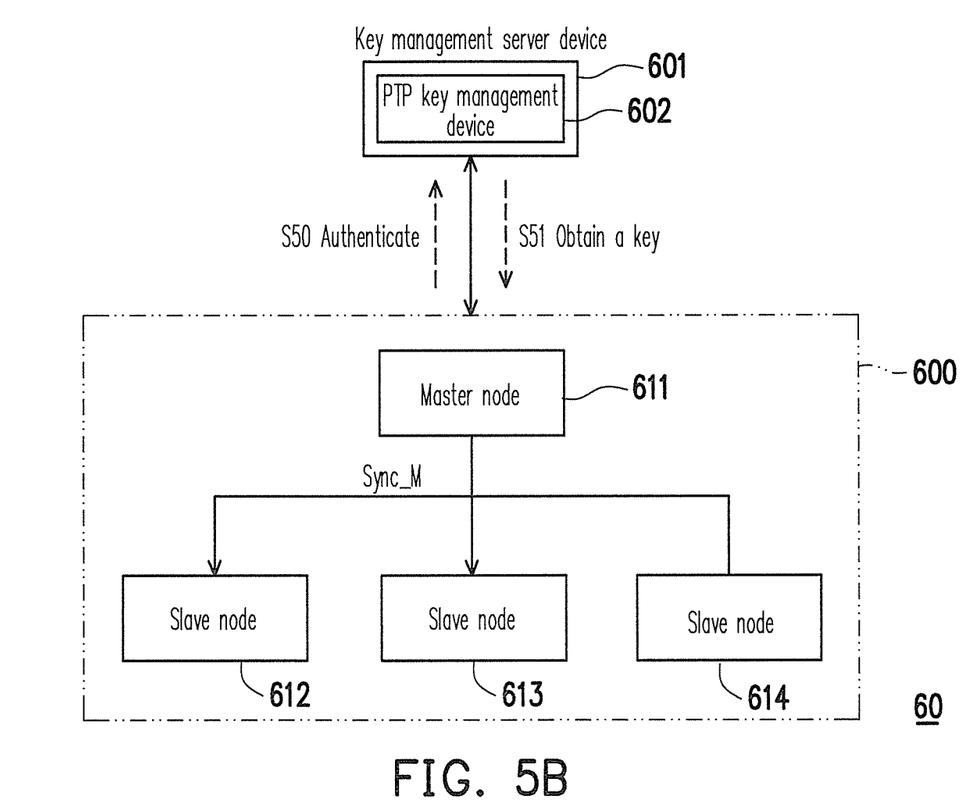
FIG. 5B is a flowchart illustrating an authentication and key acquiring process in a time synchronization system.

FIG. 5A is a schematic diagram of a time synchronization system according to an exemplary embodiment consistent with the present invention, and FIG. 5B is a flowchart illustrating an authentication and key acquiring process in the time synchronization system. Referring to FIG. 5A and FIG. 5B, the time synchronization system 60 includes a time synchronization network 600 and a PTP key management server device 601, and the time synchronization network 600 includes a master node 611 and slave nodes 612~614 connected with each other. The key management server device 601 includes a PTP key management device 602. The key management server device 601 authenticates the master node 600 and the slave nodes 612~614. The PTP key management device 602 stores a plurality of keys, manages the keys, and provides the keys to the master node 600 and the slave nodes 612~614.

Referring to FIG. 5B, in step S50, all the nodes 611~614 in the time synchronization network 600 are authenticated by the key management server device 601 after a node is newly added or a system node is initialized. Then, in step S51, the PTP key management device 602 provides keys to all the nodes 611~614. Each of the nodes 611~614 may encrypt a synchronization message to be transmitted and decrypt a received frame data according to the received key thereof.

Thereafter, please go back to see FIG. 5A, herein the structure of the master node 611 and the slave nodes 612~614 will be described in detail. In the exemplary embodiment, the master node 611 and the slave nodes 612~614 have similar structures. Thus, only the structure of the master node 611 will be described below as an example. The master node 611 includes an apparatus for encrypting/decrypting packet data of the precise time synchronization protocol. The apparatus includes a key management device 621, an IEEE 1588 PTP encoder 622, a network protocol stack and operating system circuit 623, a physical layer circuit 624, and an encryption/decryption hardware device 625. The encryption/decryption hardware device 625 is disposed between the physical layer circuit 624 and the network protocol stack and operating system circuit 623.

The key management device 621 manages the key of the master node 611. The encryption/decryption hardware device 625 encrypts the synchronization message or decrypts the frame data according to the key. The IEEE 1588 PTP encoder 622 generates the synchronization message. It should be noted that the network protocol stack and operating system circuit 623 is located above the network layer (including the network layer). It should also be noted that the key management server device 601 can be removed and the master node 611 can be served as the key management server device 601 by simply replacing the key management device 621 with the PTP key management device 602.

Figure 6:
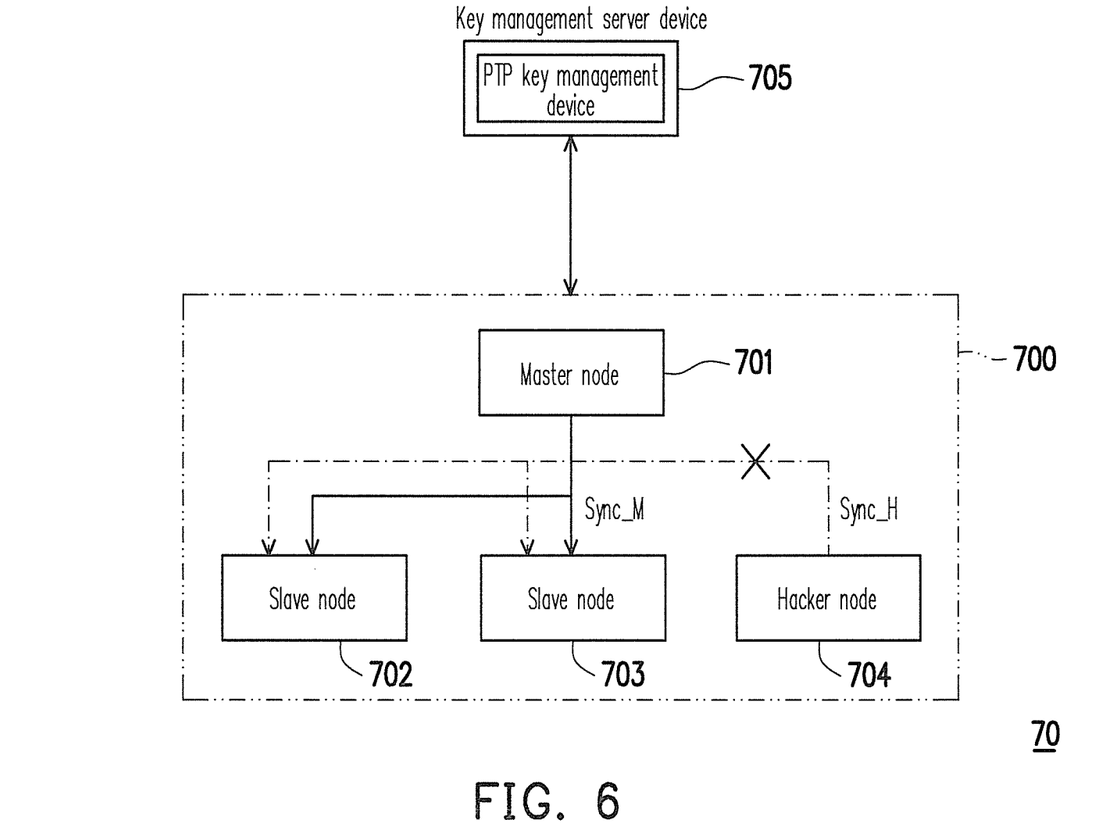
FIG. 6 is a schematic diagram illustrating a time synchronization system hacked by a hacker node.

FIG. 6 is a schematic diagram illustrating a time synchronization system hacked by a hacker node. In the exemplary embodiment, the time synchronization system 70 adopts the aforementioned authentication and key acquiring method. First, the master node 701 and the slave nodes 702 and 703 of the time synchronization network 700 are authenticated by the key management server device 705 to obtain their keys. Then, the master node 701 issues a synchronization signal Sync_M to request the slave nodes 702 and 703 to synchronize their time and then issues an encrypted synchronization message. When a hacker node 704 hacks the time synchronization network 700, the hacker node 704 cannot act as the key management server device 705 therefore cannot obtain any key. Accordingly, a synchronization message Sync_H issued by the hacker node 704 is not accepted by the slave nodes 702 and 703. Thereby, the hacker node 704 cannot interfere with the entire time synchronization network 700.

Figure 7A:
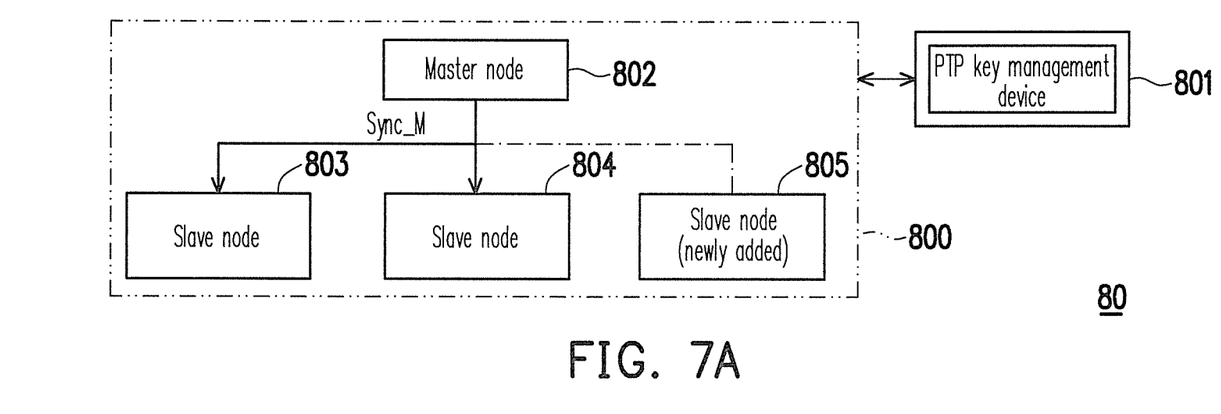
FIG. 7A is a schematic diagram illustrating how a slave node is newly added to a time synchronization system.

FIG. 7A is a schematic diagram illustrating how a slave node is added to a time synchronization system. In the exemplary embodiment, the time synchronization system 80 adopts the aforementioned authentication and key acquiring method. First, the master node 802 and the slave nodes 803 and 804 of the time synchronization network 800 are authenticated by the key management server device 801 to obtain their keys. Then, the master node 802 issues a synchronization signal Sync_M to request the slave nodes 803 and 804 to synchronize their time and then issues an encrypted synchronization message.

When a slave node 805 is newly added to the time synchronization network 800, the slave node 805 can obtain its key after it passes the authentication of the key management device 801. After that, the master node 802 instantly synchronizes its time with the slave node 805. Thus, compared to the conventional time synchronization system, the time synchronization system 800 can instantly synchronize the newly added slave node 805 with the master node 802.

Figure 7B:
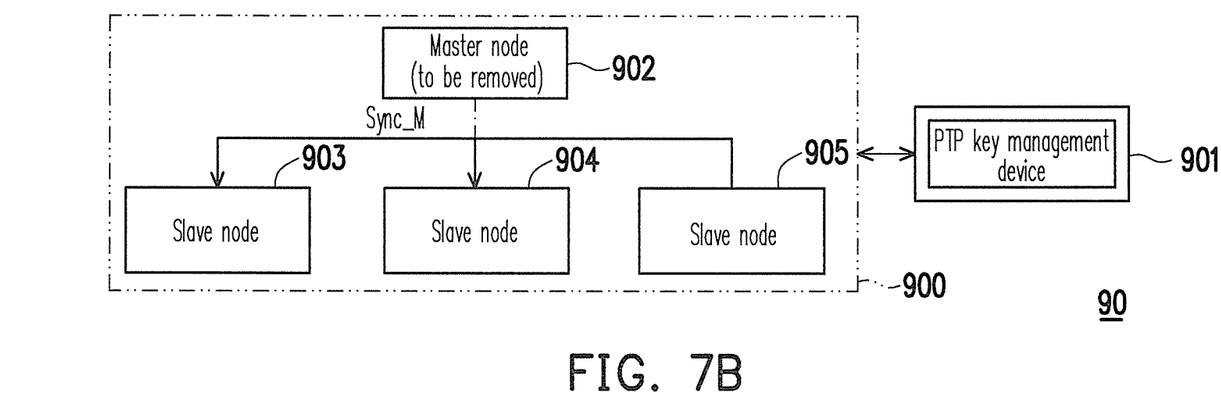
FIG. 7B is a schematic diagram illustrating how a master node is removed from a time synchronization system.

FIG. 7B is a schematic diagram illustrating how a master node is removed from a time synchronization system. In the exemplary embodiment, the time synchronization system 90 adopts the aforementioned authentication and key acquiring method. First, the master node 902 and the slave nodes 903~905 of the time synchronization network 900 are authenticated by the key management server device 901 to obtain their keys. Then, the master node 902 issues a synchronization signal Sync_M to request the slave nodes 903~905 to synchronize their time and then issues an encrypted synchronization message.

If the master node 902 is being removed from the time synchronization network 900, the slave nodes 903~905 of the time synchronization network 900 execute a best master clock (BMC) algorithm to determine one of the slave nodes 903~905 as a new master node. Once the new master node is determined, the other slave nodes 903 and 904 (assuming that the slave node 905 is determined to be the new master node) can directly synchronize their time with the newly determined master node without having to be re-authenticated or acquiring their keys again. Thus, in the time synchronization system 900, if the master node 902 is removed, time synchronization can be instantly carried out once a new master node is determined.

As described above, in the method and apparatus for encrypting/decrypting packet data of the precise time synchronization protocol and the time synchronization system provided by the exemplary embodiments of the present invention, the time delay caused by protocol stack is eliminated, the transparency in encrypting/decrypting a synchronization message is increased, and the security of the synchronization message is enhanced. Moreover, in the method and apparatus for encrypting/decrypting packet data of the precise time synchronization protocol and the time synchronization system provided by the exemplary embodiments of the present invention, when a slave node is newly added or a master node is being removed, the other nodes can be instantly synchronized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for encrypting/decrypting a packet data of a precise time synchronization protocol, suitable for a time synchronization system using a precise time protocol (PTP), wherein the time synchronization system includes a first master node and a first slave node, and the first slave node synchronizes a time of the first slave node with the first master node, the method comprising:
    disposing a first encryption/decryption hardware device on a first hardware protocol layer of the first master node, wherein the first hardware protocol layer is under a data link layer, and includes the data link layer; and
    encrypting a synchronization message by using the first encryption/decryption hardware device of the first master node to generate a frame data.

2. The method according to claim 1, further comprising:
    disposing a second encryption/decryption hardware device on a second hardware protocol layer of the first slave node, wherein the second hardware protocol layer is under the data link layer, and includes the data link layer;
    transmitting the frame data from the first master node to the first slave node; and
    decrypting the frame data by using the second encryption/decryption hardware device of the first slave node to obtain the synchronization message.

3. The method according to claim 2, wherein the first master node comprises a PTP key management device, and the method further comprises:
    authenticating the first slave node by using the PTP key management device of the first master node, and providing a key to the first slave node after the first slave node passes the authentication, wherein the first slave node decrypts the frame data according to the key.

4. The method according to claim 2, wherein the time synchronization system further comprises a key management server device, and the method further comprises:
   authenticating the first master node and the first slave node by using the key management server device, and respectively providing a first key and a second key to the first master node and the first slave node after the first master node and the first slave node pass the authentication, wherein the first master node encrypts the synchronization message according to the first key, and the first slave node decrypts the frame data according to the second key.

5. The method according to claim 4, wherein if a second slave node is newly added to the time synchronization system, the method further comprises:
   authenticating the second slave node by using the key management server device, and providing the second key to the second slave node after the second slave node passes the authentication, wherein the second slave node decrypts the frame data according to the second key.

6. The method according to claim 4, wherein the time synchronization system further comprises a second slave node, and if the first master node is being removed from the time synchronization system, the method further comprises:
   executing a best master clock (BMC) algorithm by using the first slave node and the second slave node to select one of the first slave node and the second slave node as a second master node.

7. The method according to claim 1, wherein the first hardware protocol layer is a medium access control (MAC) layer.

8. The method according to claim 1, wherein the synchronization message comprises a time stamp.

9. A time synchronization system, using a precise time protocol (PTP), the time synchronization system comprising:
   a first master node, comprising a first encryption/decryption hardware device disposed on a first hardware protocol layer of the first master node, wherein the first encryption/decryption hardware device encrypts a synchronization message to generate a frame data, and the first hardware protocol layer is under a data link layer, and includes the data link layer; and
   a first slave node;
   wherein the first master node transmits the frame data to the first slave node to synchronize the first slave node.

10. The time synchronization system according to claim 9, wherein the first slave node comprises a second encryption/decryption hardware device disposed on a second hardware protocol layer of the first slave node, and the second encryption/decryption hardware device decrypts the frame data to obtain the synchronization message, wherein the second hardware protocol layer is under the data link layer, and includes the data link layer.

11. The time synchronization system according to claim 10, wherein the first master node further comprises a PTP key management device, the PTP key management device of the first master node authenticates the first slave node and provides a key to the first slave node after the first slave node passes the authentication, and the first slave node decrypts the frame data according to the key.

12. The time synchronization system according to claim 10 further comprising a key management server device, wherein the key management server device authenticates the first master node and the first slave node and respectively provides a first key and a second key to the first master node and the first slave node after the first master node and the first slave node pass the authentication, and the first master node encrypts the synchronization message according to the first key, and the first slave node decrypts the frame data according to the second key.

13. The time synchronization system according to claim 12, wherein if a second slave node is newly added to the time synchronization system, the key management server device authenticates the second slave node and provides the second key to the second slave node after the second slave node passes the authentication, and the second slave node decrypts the frame data according to the second key.

14. The time synchronization system according to claim 12 further comprising a second slave node, wherein if the first master node is being removed from the time synchronization system, the first slave node and the second slave node of the time synchronization system execute a best master clock (BMC) algorithm to determine one of the first slave node and the second slave node as a second master node.

15. The time synchronization system according to claim 9, wherein the first hardware protocol layer is a MAC layer.

16. The time synchronization system according to claim 9, wherein the synchronization message comprises a time stamp.

17. An apparatus for encrypting/decrypting a packet data of a precise time synchronization protocol, disposed in a node of a time synchronization system using a precise time protocol (PTP), the apparatus comprising:
   a physical layer circuit;
   a network protocol stack and operating system circuit; and
   an encryption/decryption hardware device, disposed between the physical layer circuit and the network protocol stack and operating system circuit, for encrypting a synchronization message or decrypting a frame data.

18. The apparatus according to claim 17 further comprising a key management device for managing a key of the node, wherein the encryption/decryption hardware device encrypts the synchronization message according to the key or decrypts the frame data according to the key.

19. The apparatus according to claim 18, further comprising:
   an IEEE 1588 PTP encoder, for generating the synchronization message.

20. The apparatus according to claim 17, wherein the node is a master node or a slave node.

* * * * *